A. DAVIS AND C. M. CLARK.
WHEEL RIM.
APPLICATION FILED JUNE 28, 1919.
1,363,498.
Patented Dec. 28, 1920.
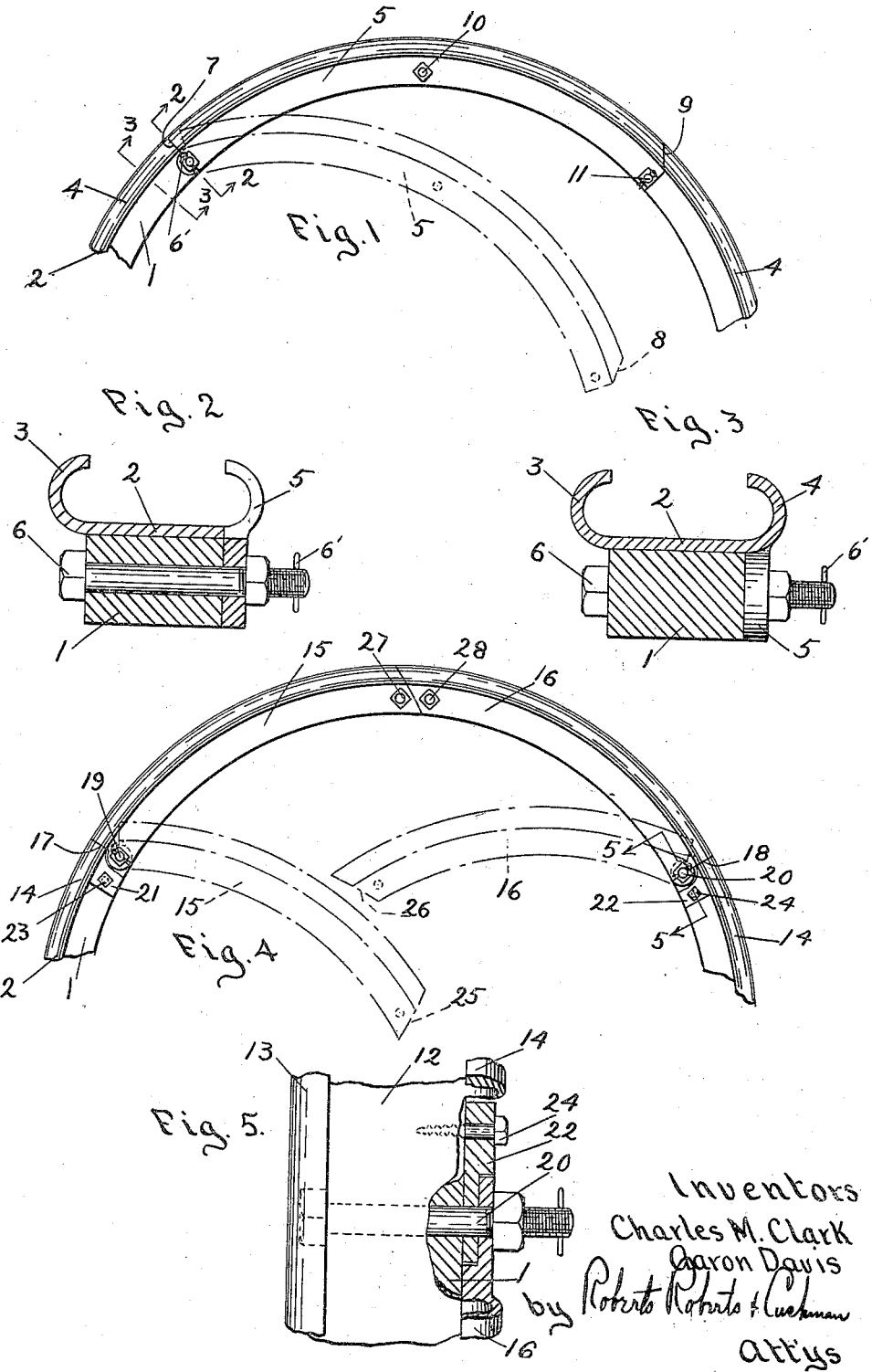

UNITED STATES PATENT OFFICE.

AARON DAVIS, OF NAHANT, AND CHARLES MOTLEY CLARK, OF BOSTON, MASSACHUSETTS; SAID DAVIS ASSIGNOR TO SAID CLARK.

WHEEL-RIM.

1,363,498.   Specification of Letters Patent.   Patented Dec. 28, 1920.

Application filed June 28, 1919. Serial No. 307,378.

*To all whom it may concern:*

Be it known that we, AARON DAVIS and CHARLES MOTLEY CLARK, both citizens of the United States, and residents of Nahant and Boston, respectively, in the counties of Essex and Suffolk, respectively, and State of Massachusetts, have invented new and useful Improvements in Wheel-Rims, of which the following is a specification.

This invention relates to a wheel rim, and more particularly to a rim provided with tire holding flanges adapted to permit the mounting and demounting of elastic tires thereupon and therefrom.

It is well known by those skilled in the art that the mounting and demounting of tires of the clencher type involves considerable labor both when fixed or demountable rims are employed.

An object of the invention is to provide a wheel rim adapted to permit the ready mounting and demounting of elastic tires, either clencher or straight side. A further object is to provide a wheel rim having a portion of its outer tire holding flange movable in the plane of the wheel to reduce the peripheral extent of the wheel whereby the tire may be slipped over the rim easily, but which is so arranged that when the movable portion is in normal extended position the tire is securely held on the rim.

Other objects of the invention will be apparent from the following description and the accompanying drawings, in which—

Figure 1 is a fragmentary side elevation of a wheel felly and rim constructed in accordance with one embodiment of our invention, the movable portion of the rim being shown by dot and dash lines in the position which it assumes when a tire is to be mounted or demounted;

Fig. 2 is a section of the felly and rim taken on line 2—2 of Fig. 1;

Fig. 3 is a section of the felly and rim taken on line 3—3 of Fig. 1;

Fig. 4 is a fragmentary side elevation of a wheel felly and rim constructed in accordance with another embodiment of our invention, the movable portion of the rim being formed in two sections and being shown by dot and dash lines in the position which it occupies when a tire is to be mounted or demounted; and Fig. 5 is a section on line 5—5 of Fig. 4.

The embodiment of our invention illustrated in Figs. 1, 2 and 3 comprises a wheel felly 1 upon which is mounted a tire supporting rim 2 secured to the felly in any well known and suitable manner. The rim 2 is provided with an inner tire-holding flange 3 integral with the rim and extending entirely around it. This flange may extend outwardly from the rim perpendicular thereto to accommodate a straight side tire, or clenched over as illustrated in Fig. 2 to embrace the bead on the edge of the well-known clencher tire.

The rim is also provided with an outer tire-holding flange 4 integral with the rim and similar to flange 3 but extending around only a major portion of the circumference of the rim, or through substantially 270° of the circumference. The outer tire-holding flange is completed by a segmental flange section 5 pivoted to the felly of the wheel at one end of the flange 4 by a bolt 6. The flange section is provided at its pivot end with a shoulder 7 which abuts the end of flange 4 when the section is in its normal or outer position. The pivot thus formed is similar to a folding ruler hinge and restrains the flange section from pivoting outwardly beyond the periphery of the rim.

The free end of section 5 is beveled at 8 and fits a similar bevel on the end of flange 4 at 9 to enable the section 5 to be swung inwardly toward the axis of the wheel. To secure the section 5 in its normal position completing the outer rim flange, bolts 10 and 11 are provided passing through suitable holes in the section and felly. The bolt 6 is preferably provided with an extended threaded end through which a cotter pin 6' passes. In demounting a tire the nuts of bolts 10 and 11 are removed and the nut of bolt 6 loosened until it bears against the pin 6'. The section 5 may then be pulled away from the felly until free from the bead of the tire and swung into the position shown by dot and dash lines.

In Figs. 4 and 5 a further embodiment of the invention is illustrated, which comprises a wheel felly 1 upon which is mounted a tire supporting rim 12 having an inner tire holding flange 13 integral therewith and extending around the entire circumference of the rim and an outer flange 14 integral with the rim and extending around a major portion of the circumference of the rim. The outer flange is completed by two segmental flange sections 15 and 16 pivoted to the felly at the ends 17 and 18 of the flange 14 by bolts 19 and 20 which also pass through lugs 21 and 22 secured to the felly by lag screws 23 and 24. The pivot ends of sections 15 and 16 and the lugs 21 and 22 are formed with overlapping interfitting portions through which the bolts 19 and 20 pass.

The free meeting ends of sections 15 and 16 are beveled at 25 and 26 preferably along a line concentric with the pivot of one of the sections, as for example concentric with the axis of bolt 19, to enable the sections to be swung inwardly toward the axis of the wheel. The sections are secured to the felly in their normal position completing the outer rim flange by bolts 27 and 28 which pass through the felly. The pivoted sections are shown swung into the position which they occupy when it is desired to mount or demount a tire on the rim by dot and dash lines.

It is evident that when the movable portion of the outer rim flange is swung inwardly that the peripheral extent of the wheel is diminished whereby the tire may be slipped over the remaining fixed portion of the rim easily.

We claim:

1. A wheel rim comprising a tire-holding flange having a portion integral with the rim, segmental tire-holding means coöperating therewith and pivoted to the wheel on a bolt in such manner that it may be swung inwardly parallel to the plane of the wheel, and an extended portion on the outer end of the said bolt having retaining means for the nut of the bolt, the said pivoted segmental means being adapted to be moved along the said extending portion, whereby the said pivoted segmental means is disengaged from the bead of a tire.

2. A wheel rim comprising a tire-holding flange having a portion integral with the rim and a remaining portion consisting of pivoted flange sections placed end to end and pivoted at the ends of said integral flange portion on a bolt in such manner that they may be swung inwardly in the plane of the wheel, and an extended portion on the outer end of the said bolt having retaining means for the nut of the bolt, the said pivoted flange sections being adapted to be moved along the said extended portion, whereby the said pivoted flange sections are disengaged from the bead of a tire.

Signed by us at Boston, Mass. this 25th day of June 1919.

AARON DAVIS.
CHARLES MOTLEY CLARK.